May 9, 1967

H. PHILLIPS ETAL
DEVICES FOR MELTING AND DISPENSING
MOLTEN THERMOPLASTIC MATERIAL 3,318,481

Filed Dec. 27, 1965

Inventors
Harry Phillips
Roland B. Lessard
By their Attorney
Ernest D. Litchfield May 9, 1967

H. PHILLIPS ETAL

DEVICES FOR MELTING AND DISPENSING
MOLTEN THERMOPLASTIC MATERIAL 3,318,481

Filed Dec. 27, 1965

4 Sheets-Sheet 3

# United States Patent Office 3,318,481
Patented May 9, 1967

3,318,481
DEVICES FOR MELTING AND DISPENSING MOLTEN THERMOPLASTIC MATERIAL
Harry Phillips, Hamilton, and Roland B. Lessard, Salem, Mass., assignors to United Shoe Machinery Corporation, Boston, Mass., a corporation of New Jersey
Filed Dec. 27, 1965, Ser. No. 526,652
15 Claims. (Cl. 222—56)

This invention relates to apparatus for melting and dispensing molten thermoplastic material and has for its object the provision of a novel and improved device for melting and dispensing thermoplastic material supplied in the form of a solid rod which is of simple and relatively inexpensive construction and yet is very efficient and dependable in operation.

With the foregoing object in view and in accordance with a feature of this invention, the herein illustrated device includes a heated melt body formed to provide a melt chamber of a size and shape to present relatively large areas of heated surface for transferring heat to the opposite sides of the leading end of a solid rod of thermoplastic material fed into the chamber, an inlet passageway leading into one end of the chamber, an outlet passage leading outwardly from the opposite end of the chamber, and is provided with means for feeding the leading end of a solid rod of thermoplastic material through the inlet passageway into the melt chamber and into contact with the heated surface areas thereof so that the solid material is melted and molten material is forced out through the outlet passageway by the solid portion of the rod as it continues to be fed into the melt chamber. In use, the outlet passageway will be connected, in any suitable manner, to some sort of a metering device, for example a gear pump, for controlling the flow of molten material to a point of use, such metering device being adapted to vary the flow from a minimum of zero to a predetermined maximum volume per unit of time, slightly less than the rate at which solid material can be melted and delivered by the melting and dispensing device.

In accordance with other features of the invention, a valve is provided for shutting off the inlet passageway, together with means responsive to pressure of molten material within the melting chamber, adjacent to the outlet passageway, for stopping and starting the rod feed means, herein illustrated as a pair of feed wheels, and for operating the valve so that the feed wheels are stopped and the valve is closed when the pressure reaches a predetermined maximum value, and the feed wheels are started and the valve opened when the pressure reaches a predetermined minimum value. More particularly, and in accordance with still further features of the invention, the melt chamber is annular in shape, of a radial dimension at least as great as the thickness of the solid rod and of an axial dimension greatly exceeding the thickness of the rod, and further includes a portion of a thickness considerably less than the thickness of the solid rod and extending radially inwardly toward the outlet passage. The melt body is also shaped to provide another portion of the melt chamber, adjacent to the outlet passageway, having a wall portion movable against a yieldable resistance. Associated with this movable wall is a member forming part of mechanism for controlling the operation of the feed wheels and the opening and closing of the valve in the inlet passageway. This movable wall and associated control mechanism thus constitutes means responsive to pressure of the molten material in this separate portion of the melt chamber for starting and stopping the feed wheels and operating the valve.

Thus, during periods when the flow through the metering device to the point of use is at the predetermined maximum rate, the movable wall is moved in one direction by pressure of molten material and in the opposite direction by the yieldable means associated therewith to start and stop the feed wheels and to open and close the valve as required to provide a continuous supply of molten material to the metering device. On the other hand, during periods of standby, i.e., when the metering device terminates flow to the point of use, after the valve in the inlet passageway has been closed as the feed wheels were stopped, the solid portion of the rod within the melting chamber will be melted and all the melted material will expand as its temperature is increased, such expansion being accommodated by additional movement of the movable wall. With this arrangement, not only is back flow of molten material through the inlet passageway prevented, but also excess pressure within the melting chamber is avoided.

The above and other objects and features of the invention will appear in the following detailed description of the preferred embodiment shown in the accompanying drawings and will be pointed out in the claims.

Figure 1:
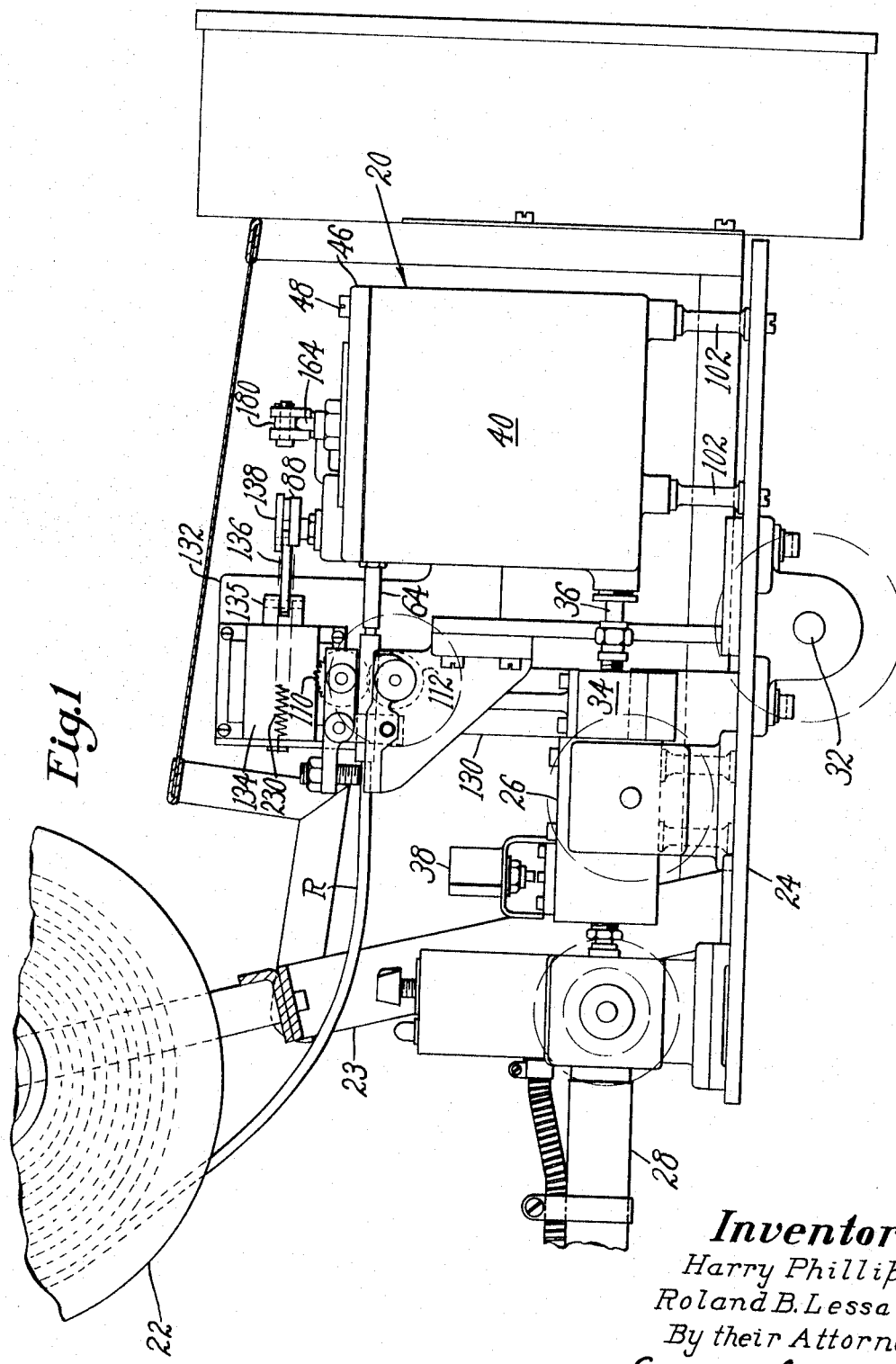
FIG. 1 is a view in side elevation of apparatus for melting and dispensing thermoplastic material embodying the features of this invention.
Figure 2:
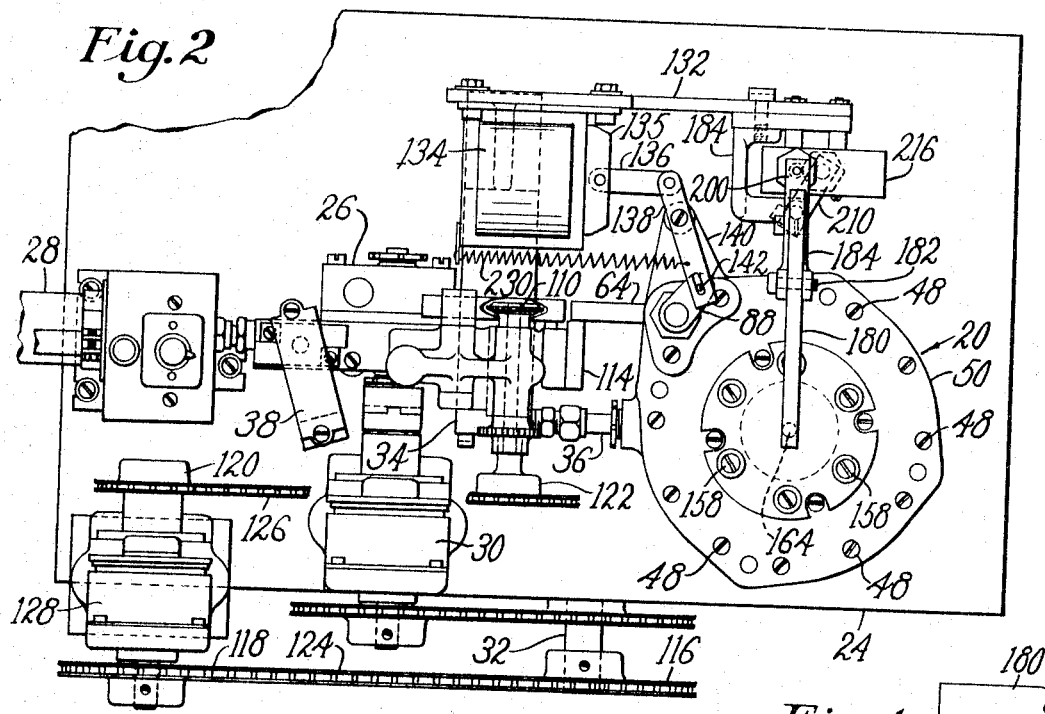
FIG. 2 is a plan view of a portion of the apparatus shown in FIG. 1.
Figure 3:
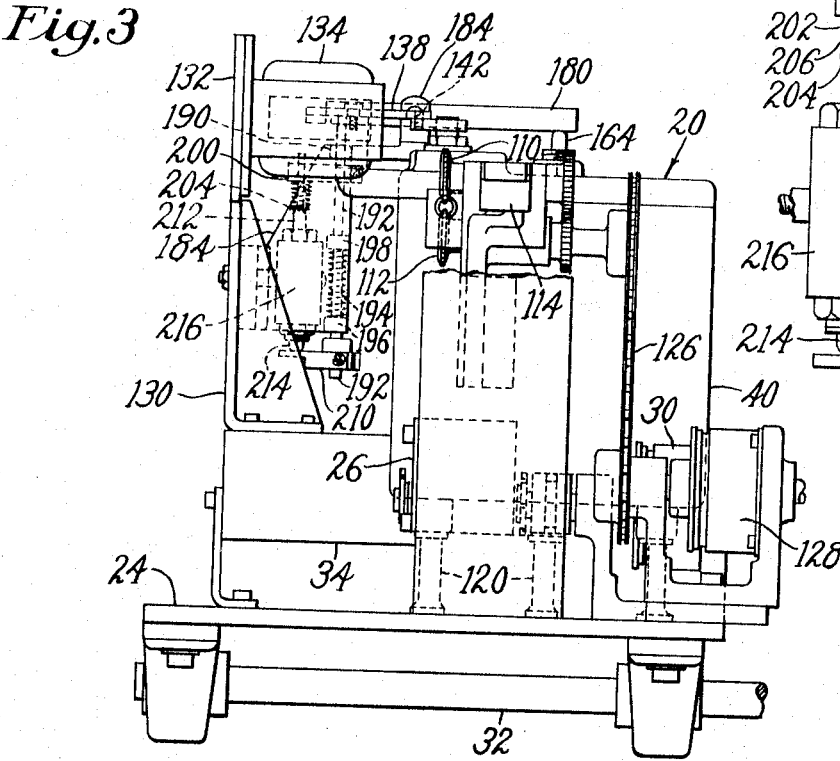
FIG. 3 is a view in end elevation of the apparatus as viewed from the left-hand end of FIG. 2.
Figure 5:
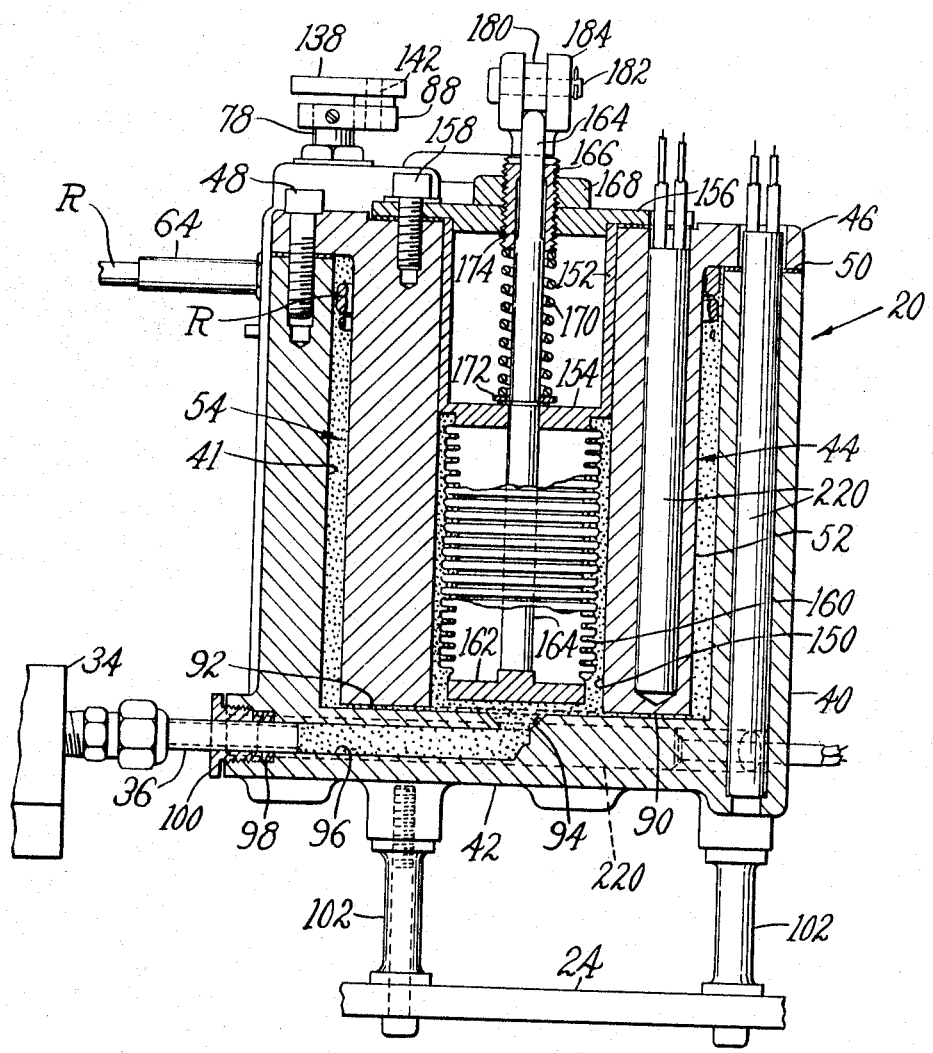
FIG. 5 is a view in vertical section of a melting body forming part of the apparatus shown in FIG. 1 and embodying the features of this invention.
Figure 6:
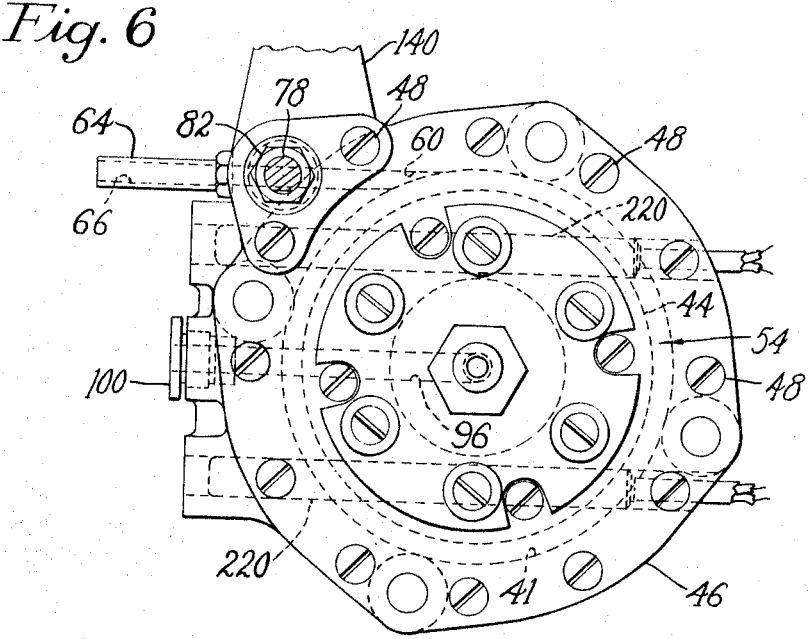
FIG. 6 is a plan view, at an enlarged scale, of a portion of the apparatus.
Figure 7:
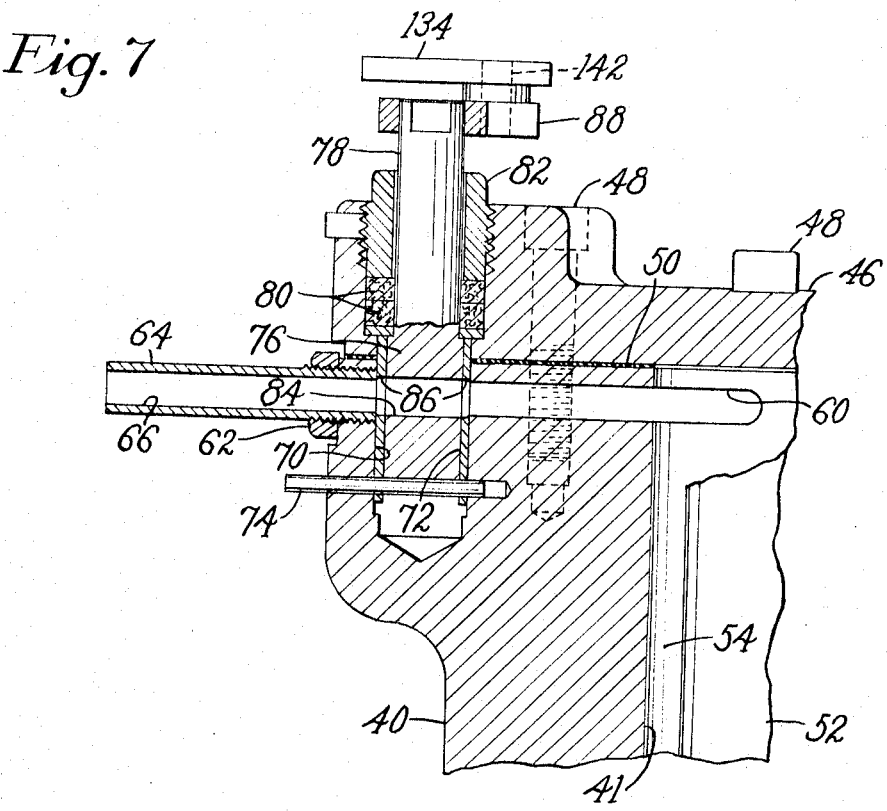
FIG. 7 is a detail view in vertical section and at a still greater enlarged scale, of a small portion of the melt body.

Referring to these drawings, the novel melting and dispensing device which forms the subject matter of this invention, and which is indicated generally by the reference character 20, is shown more particularly in FIGS. 5–7 and is illustrated in FIGS. 1–3 as associated with apparatus for dispensing molten material generally like that disclosed in U.S. Ser. No. 316,241, filed Oct. 15, 1963, in the name of John S. Kelley. This novel melting and dispensing device is adapted to receive thermoplastic material in the form of a solid flexible rod R of indeterminate length, conveniently stored on a reel 22 mounted on a bracket 23 extended upwardly from a base plate 24, render the solid rod molten, and supply molten material to a gear pump, indicated generally by the reference character 26, by means of which the molten material is delivered to a point of use through a heated hose or conduit 28.

The pump 26 which is driven through a magnetic clutch 30 from a main power shaft 32, receives molten material from a manifold 34 which, in turn, is connected to the melting and dispensing device 20 by means of a conduit 36. In order to avoid possible damage to the heated conduit 28, there is associated with the gear pump a pressure-sensitive device, not shown, which is adapted to actuate a switch 38, thereby de-energizing the clutch 30 and stopping the action of the gear pump when pressure within the conduit 28 and also within the pump, reaches a predetermined maximum value.

Referring now particularly to the novel melting and dispensing device of this invention, this has a melt body comprising an outer cylindrical member 40 provided with a cylindrical recess 41 which is closed at its lower end by a wall 42 and open at its upper end to receive an inner member 44 having a radial flange 46 adapted to close the open end of the outer member, see FIG. 5. Screws 48, 48 are provided for securing the flange 46 to the outer member and a suitable gasket 50 is provided to insure a leak-proof joint at this location. The inner member is formed with a cylindrical body 52 centrally disposed within the recess 41 thus to provide an annular space 54 which is of a radial dimension at least as great as the thickness of the rod R and of an axial dimension greatly exceeding the thickness of the rod.

Extending through the upper part of the outer member 40 is an inlet passageway 60 which, as can be more readily seen in FIG. 6, is substantially tangent to the outer wall of the recess 41. Threaded into the outer end of this passageway, and held in place by means of a lock nut 62, is an inlet tube 64 having a bore 66 of substantially the same diameter as, and in alignment with, this passageway, see FIG. 7. Intersecting the passageway 60 is a bore 70 in which there is fitted a sleeve 72, held against rotation therein by means of a pin 74 which extends through notches cut in the lower end of the sleeve. As can be seen in FIG. 7, the bore 72 is extended into the flange 46 of the inner member 44. Rotatable within this sleeve is a valve plug 76 having an upwardly extending stem 78. Suitable packing rings 80 are held in place around this stem by means of a thimble 82, threaded into an enlarged portion of the flange 46 of the inner member 44. When the valve plug is in the angular position in which it is shown in FIG. 7, a transverse bore 84 therein is in alignment with the inlet passageway 60 and the bore 66 of the inlet tube 64, respectively, and also with two diametrically disposed openings 86, 86 in the sleeve 72. Secured to the stem portion 78 of the valve plug 76 is an arm 88 by means of which the valve plug may be rotated to shut off communication between the bore 66 and the passageway 60.

The cylindrical body 52 of the inner member 44 terminates at its lower end in a radially extending surface 90 which is disposed closely adjacent the bottom of the recess 41 which also consists of a radially extending surface 92. The space between these two surfaces provides a radially extending passageway of a thickness considerably less than the thickness of the rod R and also considerably less than the radial dimension of the annular space 54. Formed in the lower wall 42 of the outer member 40 of the melt body, is a centrally located axially extending open end 94 which opens into a radially extending passageway 96. The previously mentioned conduit 36 extends into this passageway and is sealed therein by means of packing rings 98 and a thimble 100. As shown in FIGS. 1 and 5, the melt body is supported on the base plate 24 by means of spacing blocks 102, 102, thus affording a free circulation of air therebeneath.

For feeding the leading end of a solid rod R of thermoplastic material through the inlet tube 64 and inlet passageway 60 into the upper portion of the annular space 54, a pair of feed wheels 110, 112 are provided. These feed wheels are mounted on a bracket member, indicated generally by the reference character 114 and are driven from the main power shaft by means of sprockets 116, 118, 120 and 122, chains 124, 126 and a magnetic clutch 128. Mounted on the manifold 34 is another bracket 130 to which there is secured a mounting plate 132. Secured to this plate is a solenoid 134 having an armature 135 to which there is connected one end of a link 136, FIG. 2. The other end of this link is, in turn, connected to one end of a lever 138 which is pivotally mounted on an outwardly extending portion 140 of the flange 46. The other end of this lever is slotted to fit over a pin 142 in the arm 88, mentioned above. As will presently appear, the magnetic clutch 128 and the solenoid 134, which are in a electric circuit, not shown, are energized and de-energized, thus to start and stop the feed wheels 110, 112 and to open and close the valve 76, in response to pressure of the molten material within the melting and feeding device 20.

Referring now to FIG. 5, the body portion 52 of the inner member 44 is formed with a central bore 150. Fitted into the upper portion of this bore is a cup-like member 152 having a bottom wall 154. At its upper end, this cup-like member is secured to a cover plate 156 which is clamped against the upper part of the member 44 by means of screws 158, 158. Secured to a shoulder formed on the lower side of the bottom wall 154 of the member 152 is the upper end of a Sylphon bellows 160, the lower end of which is secured to a plunger 162. Formed interally with this plunger is a rod 164 which extends upwardly through a bore in the wall 154, the cup-shaped member 152, and also through a guide bushing 166 which is threaded into the cover plate 156 and held in place by means of a locknut 168. A compression spring 170 interposed between the lower end of the guide bushing 166 and a snap ring 172, secured to the rod 164, tends to hold the plunger 162 and bellows 160 yieldingly in the positions in which these elements are shown in FIG. 5 and with the snap ring 172 bearing against the wall 154. At its upper end, the rod 164 is reduced in diameter to provide a shoulder 174 for limiting upward movement of the rod 164 and plunger 162 as molten thermoplastic material enters and begins to fill the bore 150.

At its upper end, the rod 164 is rounded off and bears against one end of a lever 180, FIGS. 2, 3 and 5. This lever is pivotally mounted by means of a trunnion 182 on the outer end of a bracket member 184 which is secured to the plate 132, mentioned above. Mounted for vertical sliding movement in bosses 190, 196 on the bracket member 184 is a rod 192 which is urged yieldingly upwardly into engagement with the other end of the lever 180, by means of a relatively light compression spring 194, interposed between the boss 196 and a collar 198 on the rod. Adjustably secured to the upper part of this rod is an arm 200 in which there is slidably mounted a plunger 202 having an enlarged head 204. A compression spring 206 is arranged to hold this headed plunger in the position shown in FIGS. 3 and 4, with a cotter pin 208 bearing against the upper end of the arm 200. At its lower end, the rod 192 carries another arm 210 and interposed between this arm and the headed plunger 202 are the two operating plungers 212, 214 of a microswitch 216, mounted on the bracket 130. This microswitch is in the electrical circuit, not shown, which is associated with the magnetic clutch 128 and also with the solenoid 134.

Figure 4:
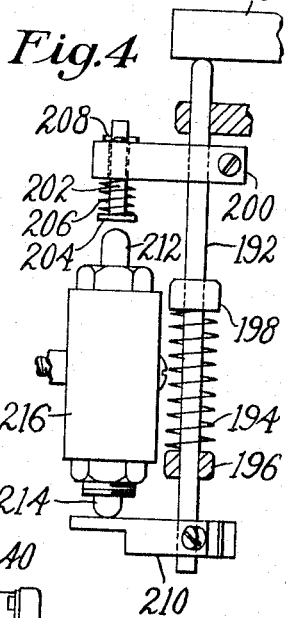
FIG. 4 is a detail view of a portion of a control mechanism associated with the apparatus.

The arrangement is such that when the plunger 162 is in its lowermost position, FIGS. 3, 4 and 5, with washer 172 resting on the wall 154, the spring-pressed plunger 202 will be moved upwardly and away from the switch plunger 212 while the arm 210 will just contact the plunger 214 and close the switch 216, thus energizing the magnetic clutch 128 and the solenoid 134. The feed wheeds 110, 112 will now feed the leading end of the flexible rod R through the inlet tube, the valve bore 85 and the inlet passage 60 into the upper portion of the annular space 54. The outer member 40 and inner member 44 are each heated to a relatively high temperature by means of electrical heaters 220, 220 controlled by the suitable thermostat, not shown. Thus, the leading end of the rod will soon be melted as it works its way circumferentially around the annular space and travels toward the lower portion of this space in a sort of a spiral path surrounding the inner cylindrical body portion 52. Eventually, the annular space 54 will become entirely filled with the thermoplastic material, now partly still in the form of a solid or semi-solid rod in the vicinity of the inner passage 60 and partly in a molten state, especially in the lower portion of this annular space adjacent the restricted passageway provided between the end surface 90 of the cylindrical portion 52 of the inner member 44 and the bottom wall 92 of the recess 41.

As the feed wheels continue to rotate the entering solid rod R will force the molten material through the aforementioned restricted passageway toward the outlet opening 94 and into the lower portion of the bore 150. Assuming that the gear pump 26 is not operating, the outlet passage 96 and other passageways leading therefrom to this pump will soon be filled and the molten material still entering the bore 150 will exert pressure on the plunger 164 tending to elevate it against the resistance of the spring 170. As more molten material enters the bore 150 the plunger 162 will be moved upwardly by the pressure of the molten material, while the rod 192 will moved downwardly so that eventually, and depending on the location of the arm 200 on this rod, the headed plunger 202 will engage the plunger 212 of the microswitch 216 and open this switch, thereby de-energizing the clutch 128 and solenoid 134. The feed wheels will now come to a stop and a spring 230 will move the armature of the solenoid 134 to the right, FIG. 2, thereby swinging the lever 138 in a direction and to an extent sufficient to effect a 90° rotation of the valve plug 76. As this valve plug turns, it shears off that portion of the rod R within the bore 84 and effectively seals off the inlet passageway 60.

The speed of the feed wheels is so determined, by suitably selecting the sizes of sprockets 116, 118, 120 and 122, that the volumetric rate of feed of the solid rod R into the space 54 is somewhat in excess of the volumetric output of the gear pump 26. Thus, so long as the gear pump is operating, the plunger 162 will oscillate between a lowermost position, in which the switch 216 is closed, to start the feed wheels 110, 112 and to open the valve 76, and an upper position in which the plunger 202 engages the plunger 212 and opens this switch to stop the feed wheels and to close the valve 76. When the gear pump is stopped, discharge of molten material from the melting device is, of course, prevented. Therefore, when the plunger 162 has been elevated to the aforementioned upper position to stop the feed wheels and to close the valves, the solid portion of the rod R within the annular space 54 will continue to be melted and this molten material will tend to expand as its temperature rises. As a result of such expansion of the molten material, the plunger 162 will be elevated still further, spring 206, FIG. 4, yielding to prevent damage to the switch 216. When the gear pump 26 is again put into operation, molten material will be withdrawn from the bore 150 until the switch 216 is closed. As will be apparent, the spring 170 exerts a constant force on the plunger 162, thus causing molten material to be supplied to the gear pump under a substantially constant pressure.

The novel and improved melting and dispensing device which has just been described, while of relatively simple construction and employing no moving parts within the melt body itself, is very efficient in operation, especially because of the provision of a melting chamber of ample capacity to insure a melting of the rod at the desired rate (i.e., gr./min.) and of a shape to present both sides of the solid rod to heated surfaces thereof, i.e., walls 41 and 52. By coordinating the starting and stopping of feed wheels with the opening and closing of an inlet shut-off valve, made possible by the provision of an expansion chamber within the device, i.e., the bore 150 and plunger 162, blow-back of molten material along the inlet tube during standby periods is effectively avoided. Finally, by providing a restricted passageway leading from the melt chamber 54 to the bore 150, it is possible to effect a significant increase in the temperature of the molten material during its travel through this restricted passageway. For example, with the heating units 220 and thermostat so selected and set as to provide a temperature of the molten material in the extreme lower portion of the annular space 54 of about 250° F., it is possible to obtain a temperature of the molten material in the bore 150, adjacent to the outlet opening 94, of approximately 450° F.

While the capacity of the novel and improved melting and dispensing device will obviously vary in accordance with its physical dimensions and to some extent will, of course, depend on the character of the solid thermoplastic material being handled, an output of approximately 240 gr./min. has been obtained with a device in which the mean diameter of the annular space 54 was 4⅝″, its height, or axial dimension was 5½″, and its radial width ¼″, and with the feed wheels operating at a rate to feed approximately 40 ft. of ¼″ rod per minute. In this particular device, the distance between the surfaces 90 and 92 was approximately .030″.

Having described the invention, what is claimed as new and desired to secure by Letters Patent of the United States is:

1. A device for melting and dispensing molten thermoplastic material supplied in the form of a solid flexible rod comprising a melt body formed to provide a melt chamber of a size and shape to present relatively large surface areas to the opposite sides of the leading end of a solid rod of thermoplastic material fed into said chamber, an inlet passageway leading into one end of the chamber and an outlet passageway leading outwardly from the opposite end of the chamber, means for heating said melt body, a valve in said inlet passageway, means for feeding the leading end of a solid rod of thermoplastic material through the inlet passage and said valve into the melt chamber, and means responsive to pressure of molten material in said melt chamber for opening and closing said valve and for controlling the operation of said rod feeding means.

2. A device in accordance with claim 1 wherein said melt body is also formed to provide a passageway of restricted thickness adjacent to the outlet passageway.

3. A device in accordance with claim 1 wherein said melt body is formed is provide a separate portion of the melt chamber adjacent to the outlet passage and wherein the means for opening and closing said valve and for controlling the rod feeding means is responsive to pressure of the molten material in said separate portion of the melt chamber.

4. A device for melting and dispensing molten thermoplastic material supplied in the form of a solid flexible rod, comprising a melt body shaped to provide an annular space closed at its opposite ends and of a radial dimension at least as great as the thickness of said solid rod and of an axial dimension greatly exceeding the thickness of the rod, an inlet passage adjacent to one end of said annular space and an outlet passage adjacent to the opposite end of said space, means for heating said melt body and means for feeding the leading end of a solid rod of thermoplastic material through said inlet passage and into said annular space to cause said rod to be melted as it traverses said space and molten material to be extruded through the outlet passage by the solid rod being fed into said space.

5. A device in accordance with claim 4 wherein said inlet passage extends substantially tangentially to said one end of the annular space.

6. A device according to claim 4 wherein said outlet passage includes a portion extending radially inwardly from said opposite end of the annular space and an axially extending portion opening from said radially extending portion substantially on the longitudinal axis of the annular space.

7. A device in accordance with claim 4 wherein said outlet passage includes a portion extending radially inwardly from said opposite end of the annular space of a thickness considerably less than the thickness of the solid rod and an axially extending portion opening from said radially extending portion substantially on the longitudinal axis of the annular space.

8. A device in accordance with claim 4 also provided with means responsive to pressure of molten material in said annular space for controlling the action of the rod feeding means.

9. A device in accordance with claim 4 in which a valve is interposed in said inlet passage and means responsive to pressure of molten material in said annular space is provided for closing said valve and stopping the rod feeding means when the pressure of the molten material reaches a predetermined maximum value and for opening said valve and starting the rod feeding means when the pressure of the molten material drops to a predetermined minimum value.

10. A device for melting and dispensing molten thermoplastic material supplied in the form of a solid flexible rod having a melt body comprising an outer member formed with a cylindrical recess open at one end and closed at its opposite end, an inner member having a radial flange adapted to close the open end of said outer member and a cylindrical body centrally disposed within the cylindrical recess of the outer member to provide an annular space closed at its opposite ends and of a radial dimension at least as great as the thickness of said solid rod and of an axial dimension greatly exceeding the thickness of the rod, said outer member being formed with an inlet passage adjacent to one end of said annular space and with an outlet passage opening into the cylindrical recess substantially coaxially therewith, said cylindrical body portion of the inner member terminating in a radially extending surface spaced closely adjacent to the closed end of said recess thus to provide a restricted passageway from the annular space to said outlet passage, means for heating said inner and outer members, and means for feeding the leading end of a solid rod of thermoplastic material through said inlet passage and into the annular space to cause said rod to be melted as it traverses said space and molten material to be extruded through the outlet passage by the solid rod being fed into said space.

11. A device in accordance with claim 10 wherein said inlet passage extends substantially tangentially to said one end of the annular space.

12. A device in accordance with claim 10 wherein said cylindrical body portion is shaped to provide cylindrical chamber opening from its radially extending surface opposite to said outlet passage, and wherein means are disposed in said cylindrical chamber responsive to pressure of the molten material for controlling the action of said rod feeding means.

13. A device in accordance with claim 10 in which a valve is interposed in said inlet passage and wherein said cylindrical body portion is shaped to provide a cylindrical chamber opening from its radially extending surface opposite to said outlet passage and wherein means are disposed in said cylindrical chamber responsive to pressure of the molten material for opening and closing said valve and for controlling the action of said rod feeding means.

14. A device in accordance with claim 10 wherein said cylindrical body portion is shaped to provide a cylindrical chamber opening from its radially extending surface, opposite to said outlet passage, and in which there is located a plunger yieldably urged in a direction to expel molten material from said chamber and means are provided responsive to movement of said plunger for controlling the operation of said rod feeding means.

15. A device in accordance with claim 10 in which a valve is interposed in said inlet passageway and wherein said cylindrical body portion is shaped to provide a cylindrical chamber opening from its radially extending surface, opposite to said outlet passage, and in which there is located a plunger yieldably urged in a direction to expel molten material from said chamber and wherein means are provided responsive to movement of said plunger for opening and closing said valve and for controlling the operation of said rod feeding means.

References Cited by the Examiner

UNITED STATES PATENTS

| | | | |
|---|---|---|---|
| 1,874,025 | 8/1932 | Clapp | 222—63 |
| 2,765,768 | 10/1956 | Paulsen | 222—146 X |
| 2,866,885 | 12/1958 | McIlrath | 219—302 X |
| 3,170,608 | 2/1965 | Oakes et al. | 222—505 X |
| 3,227,311 | 1/1966 | Rowell | 222—504 X |
| 3,239,103 | 3/1966 | Kelley | 222—56 |

RAPHAEL M. LUPO, *Primary Examiner.*